Patented Sept. 7, 1943

2,328,894

UNITED STATES PATENT OFFICE 2,328,894

COMPOSITION

Edgar J. Cranmer, Los Angeles, Calif.

No Drawing. Application October 24, 1941,
Serial No. 416,406

2 Claims. (Cl. 106—116)

The object of my invention is the production of a composition or cement to be applied to the surfaces of wood as a filler for scratches, holes and the like.

Heretofore much difficulty has been experienced in connection with the reconditioning of forms used in concrete construction work. In work requiring a smooth surface on the finished concrete, it is common practice to employ plywood as form material. To secure a smooth surface on the finished concrete, it is necessary that the plywood surface be sanded smooth and oiled each time it is put into the form. The life of plywood used in concrete forms is short due to rough handling and the reaction of concrete on the wood. As a rule, after one time in the form, the plywood surface is weather checked or full of scarred places. Where a finished surface on the concrete is required the damaged plywood form must be discarded unless a satisfactory patch can be made.

There are many fillers on the market that work satisfactorily in large cracks or holes in clean lumber, but there are no satisfactory fillers for filling small cracks or scratches in oiled plywood where a smooth surface is required. Due to the fact that this wood has been previously oiled makes it difficult to get a filler or putty in a small dent or scratch that will stick to the oiled wood, also dry or set so that it can be sanded in a few minutes after application and not be affected by water, cement or oil.

Accordingly, an object of my invention is to provide a filler possessing the following requirements: (a) a filler that will stick to wood that has been oiled; (b) set up in a short time; (c) dry hard as the wood; (d) sand smooth and fill all checked places and stand up in water, oil and cement.

My composition consists of a mixture of a hardening agent, such as hard wall plaster devoid of fiber; a body and graining agent which gives the composition a fine grain for sanding, such as whiting; a binder such as shellac; and a drying agent acting such as to permit quick sanding, such as acetone.

In preparing the composition, I prefer to use the ingredients in about the following proportions by volume: hard wall plaster 80% and whiting 20%. These ingredients constitute the body of the composition, while the binder comprises 4 pounds of cut shellac to 1 gallon of commercial shellac thinner and acetone. The shellac solution comprises 95% by volume of the binder.

The hard wall plaster and whiting are stirred until well mixed. Color may then be added, which color may comprise color-dry paint pigment added to suit the work. Into these ingredients is stirred enough binder to make a stiff paste of such consistency as to enable it to be plastered over surfaces to be mended or into dents and scratches in the wood.

The hard wall plaster gives the composition a hard body; the whiting gives the body a fine grain which facilitates sanding thereof; the shellac binder sticks to wood and also dries hard and is not affected by water, oil or cement; and, the acetone hastens the drying of the composition to permit quick sanding.

My composition is easily mixed, is easily applied and will stick to wood that has been oiled, does not crack when it dries to the surface to which it is applied, sets up in a short time, dries as hard as wood, will sand smooth and fill all the checked places and stand up in water, oil and cement, and, as a whole, possesses in a high degree all the desired properties of a composition for treating oiled plywoods and the like employed in the construction of concrete forms.

Without further elaboration, the foregoing will so fully illustrate my invention that others may, by applying current knowledge, readily adapt the same for use under various conditions of service.

I claim:

1. A plastic filler composition for oiled wood and the like comprising a body made up of hard wall plaster, whiting, and a binder made up of a shellac solution and acetone.

2. A plastic filter composition for oiled wood and the like comprising a body made up of hard wall plaster and whiting in the relative proportions of 80% and 20% by volume, respectively; and a binder for the body made up of four pounds of shellac to one gallon of shellac thinner and acetone, with the acetone comprising 5% by volume to the shellac solution.

EDGAR J. CRANMER.